United States Patent
Kim (10) Patent No.: US 12,535,954 B2
(45) Date of Patent: Jan. 27, 2026

(54) STORAGE DEVICE AND OPERATING METHOD THEREOF

(71) Applicant: SK hynix Inc., Icheon-si (KR)

(72) Inventor: Tae Hoon Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/938,906

(22) Filed: Nov. 6, 2024

(65) Prior Publication Data

US 2025/0208768 A1    Jun. 26, 2025

(30) Foreign Application Priority Data

Dec. 21, 2023    (KR) .................. 10-2023-0188013

(51) Int. Cl.
    *G06F 3/06*     (2006.01)

(52) U.S. Cl.
    CPC ............ *G06F 3/0619* (2013.01); *G06F 3/064* (2013.01); *G06F 3/0673* (2013.01)

(58) Field of Classification Search
    CPC ...... G06F 3/0619; G06F 3/064; G06F 3/0673; G06F 3/0659; G06F 3/0604; G06F 3/0614; G06F 3/0658; G06F 2212/1016; G06F 2212/1032

See application file for complete search history.

(56) References Cited

U.S. PATENT DOCUMENTS

| | | | |
|---|---|---|---|
| 2020/0192791 A1* | 6/2020 | Yang | H04L 1/203 |
| 2021/0263821 A1* | 8/2021 | Yang | G06F 11/3034 |
| 2022/0199179 A1* | 6/2022 | Padilla | G06F 11/076 |
| 2023/0024177 A1 | 1/2023 | Yeung et al. | |
| 2023/0195354 A1 | 6/2023 | Liu et al. | |
| 2023/0401124 A1* | 12/2023 | Xu | G06F 11/076 |
| 2024/0231632 A1* | 7/2024 | Kim | G06F 3/0659 |

FOREIGN PATENT DOCUMENTS

KR    10-2020-0084200 A    7/2020

* cited by examiner

*Primary Examiner* — Jason W Blust (57) ABSTRACT

Disclosed is a storage device capable of improving performance by changing a period of a scan operation, and an operating method of the same. The storage device may include a memory including a plurality of memory blocks and a controller configured to set a plurality of scan trigger groups having different scan trigger periods, perform a scan operation on the plurality of memory blocks, assign each of the plurality of memory blocks to one of the plurality of scan trigger groups based on the number of bit errors included in data read by each of the memory blocks, and set different scan trigger periods for the memory blocks based on the scan trigger group to which each of the memory blocks belongs.

20 Claims, 7 Drawing Sheets

STORAGE DEVICE AND OPERATING METHOD THEREOF

CROSS-REFERENCE TO RELATED APPLICATION

The present application claims the benefit of priority under 35 U.S.C. § 119 (a) of Korean Patent Application No. 10-2023-0188013, filed Dec. 21, 2023 in the Korean Intellectual Property Office, which is incorporated in its entirety herein for all purposes by this reference.

FIELD

The present disclosure relates to a storage device and more particularly to a storage device capable of improving performance by changing a period of a scan operation, and an operating method of the same.

BACKGROUND

A storage device is capable of storing data based on requests from a computer, a mobile terminal such as a smartphone, a tablet PC, and the like, and from a host in these various electronic devices.

The storage device may further include a controller for controlling a memory (e.g., a volatile memory or a non-volatile memory). Such a controller receives commands from the host and based on the received commands, performs or controls operations to read, write, or erase data in the memory included in the storage device.

The storage device may detect in advance the error occurrence probability in its memory and may perform scan operations to periodically scan the memory in order to perform a defensive operation for preventing errors from occurring in advance. This scan operation can ensure the stability of the storage device by preemptively detecting and taking action against the occurrence of an error within the memory. However, the storage device may delay processing of commands received from the host during the scan operation, which may result in performance degradation from the viewpoint of the host.

SUMMARY

The purpose of the present disclosure is to provide a method of an operating a storage device, which differentially applies the priority and period of the scan operation based on the number of error bits that can be checked during the data read operation. The method mitigates the performance degradation caused by a scan operation and a consequent read reclaim operation, etc., so that scan operations can be minimized.

In an aspect is a storage device including a memory including a plurality of memory blocks and a controller configured to set a plurality of scan trigger groups having different scan trigger periods, perform a scan operation on the plurality of memory blocks, assign each of the plurality of memory blocks to one of the plurality of scan trigger groups based on the number of bit errors included in data read by each of the memory blocks, and set different scan trigger periods for the memory blocks based on the scan trigger group to which each of the memory blocks belongs.

In another aspect is a storage device including a memory including a plurality of memory blocks and a controller configured to set a plurality of scan trigger groups having different scan trigger periods, assign each of the plurality of memory blocks to one of a plurality of memory block groups, perform a scan operation on the plurality of memory block groups, select, for each of the plurality of memory block groups, a target memory block from among the memory blocks belonging to each of the memory block groups, read data from the selected target memory block, assign the memory block group to which the target memory block belongs to one of the plurality of scan trigger groups based on the number of bit errors included in the data read from the target memory block, and set different scan trigger periods for the memory block groups based on the scan trigger group to which the each of the memory block groups belongs.

In a further aspect is an operating method of a storage device. The operating method includes setting a plurality of scan trigger groups having different scan trigger periods, assigning each of plurality of memory blocks included in a memory to one of the plurality of scan trigger groups, triggering a scan operation on each of the plurality of memory blocks based on the scan trigger period set for the scan trigger group to which each memory block belongs and performing the scan operation on the memory block in which the scan operation has been triggered.

According to the embodiments of the present disclosure, unnecessary scan operations are minimized, and at the same time, uncorrectable error correction codes that are likely to occur during scan operations are also reduced to improve the performance of the storage device.

DETAILED DESCRIPTION

Hereinafter, embodiments of the present disclosure will be described in detail with reference to the accompanying drawings.

Figure 1:
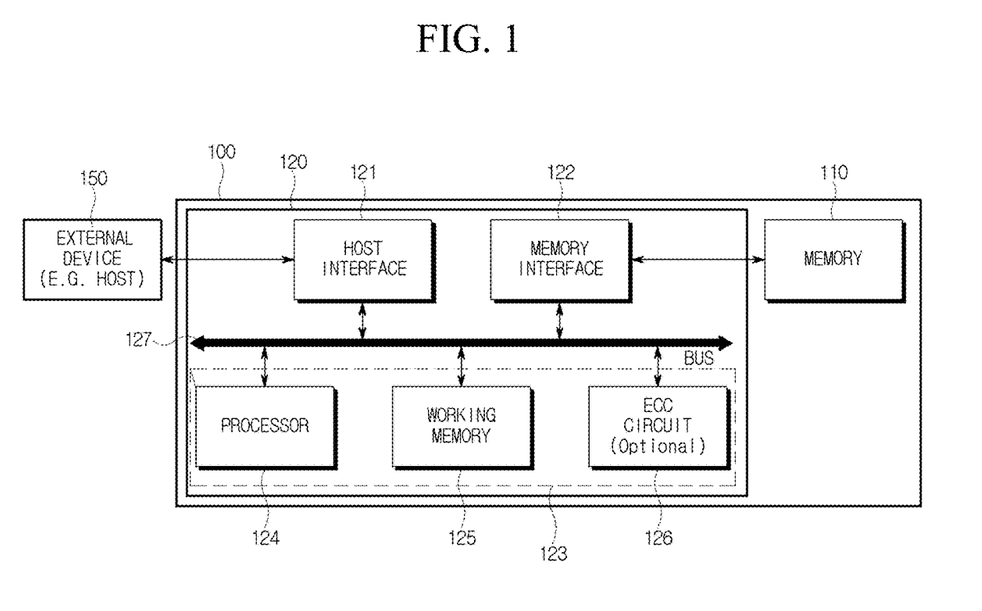
FIG. 1 shows a schematic configuration of a storage device according to embodiments of the present disclosure.

FIG. 1 shows a schematic configuration of a storage device according to embodiments of the present disclosure.

Referring to FIG. 1, a storage device 100 may include a memory 110 that stores data, a controller 120 that controls the memory 110, and the like.

The memory 110 operates in response to the control of the controller 120. Here, an operation of the memory 110 may include, for example, a read operation, a program operation (also, referred to as a write operation), and an erase operation.

For example, the memory 110 may be implemented in various types of memories such as double data rate synchronous dynamic random access memory (DDR SDRAM), low power double data rate 4 (LPDDR4) SDRAM, graphics double data rate (GDDR) SDRAM, low power DDR (LPDDR), rambus dynamic random access memory (RDRAM), NAND flash memory, 3D NAND flash memory, NOR flash memory, resistive random access memory (RRAM), phase change memory (PRAM), magnetoresistive random access memory (MRAM), ferroelectric random access memory (FRAM), or spin transfer torque random access memory (STT-RAM), etc.

The memory 110 may be implemented into a three-dimensional array structure. Embodiments of the present disclosure can be applied not only to a flash memory in which a charge storage layer is composed of a conductive floating gate, but also to a charge trap type flash (CTF) in which the charge storage layer is composed of an insulation layer.

The memory 110 may receive commands and addresses from the controller 120 and may access an area in a memory cell array selected by an address. That is, the memory 110 may perform an operation indicated by a command with respect to the area selected by the address.

For example, the memory 110 may perform a program operation, a read operation, and an erase operation. During a program operation, the memory 110 may program data in the area selected by the address. During a read operation, the memory 110 may read data from the area selected by the address. During an erase operation, the memory 110 may erase data stored in the area selected by the address.

The controller 120 may control the write (program), read, erase, and background operations on the memory 110. Here, the background operation may include, for example, one or more of garbage collection (GC), wear leveling (WL), read reclaim (RR), and bad block management (BBM), etc., but examples are not limited to the above list.

The controller 120 may control the operation of the memory 110 in accordance with a request from an external device 150, such as a host (HOST), located outside the storage device 100. On the other hand, the controller 120 may control the operation of the memory 110 independently of any request from the external device 150.

The external device 150 may include a computer, ultra-mobile PCs (UMPCs), a workstation, a personal digital assistant (PDAs), a tablet PC, a mobile phone, a smart phone, an e-book, a portable multimedia player (PMP), a portable game machine, a navigation system, a black box, a digital camera, a digital multimedia broadcasting (DMB) player, a smart television, a digital audio recorder, a digital audio player, a digital picture recorder, a digital picture player, a digital video recorder, a digital video player, a storage forming a data center, one of various electronic devices constituting a home network, one of various electronic devices constituting a computer network, one of various electronic devices constituting a telematics network, a radio frequency identification (RFID) device, or a mobile device (e.g., a vehicle, a robot, a drone) that travels on the ground, in the water or in the air under human control or autonomously.

The external device 150 may include at least one operating system (OS). The operating system can manage and control overall functions and operations of the external device, and can provide mutual operations between the external device and the storage device 100. The operating system may be divided into a general operating system and a mobile operating system, depending on the mobility of external devices.

The controller 120 and the external device 150 may be separated from each other. In some cases, the controller 120 and the external device 150 may be implemented as one integrated device. Hereinafter, for convenience of description, an example will be described in which the controller 120 and the external device 150 are separated from each other.

Referring to FIG. 1, the controller 120 may include a memory interface 122 and a control circuit 123, and may further include a host interface 121.

The host interface 121 provides an interface for communicating with the external device 150. For example, the host interface 121 provides an interface that uses at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, Serial-ATA protocol, a Parallel-ATA protocol, a small computer small interface (SCSI) protocol, an enhanced small disk interface (ESDI) protocol, an integrated drive electronics (IDE) protocol, a proprietary protocol, and other similar protocols.

When receiving a command from the external device, the control circuit 123 may receive the command through the host interface 121 and may perform an operation of processing the received command.

The memory interface 122 may be connected to the memory 110 to provide an interface for communicating with the memory 110. That is, the memory interface 122 may be configured to provide an interface between the memory 110 and the controller 120 in response to control of the control circuit 123.

The control circuit 123 controls the operation of the memory 110 by performing overall control operations of the controller 120. To this end, for example, the control circuit 123 may include at least a processor 124 and a working memory 125, and may selectively include an error detection and correction circuit (ECC) 126.

The processor 124 may control overall operations of the controller 120 and may perform logical operations. The processor 124 may communicate with the external device through the host interface 121 and may communicate with the memory 110 through the memory interface 122.

The processor 124 may perform a function of a flash translation layer (FTL). The processor 124 may convert a logical block address (LBA) provided by the host into a physical block address (PBA) through the flash translation layer (FTL). Through use of a mapping table, the flash translation layer (FTL) may receive the logical block address (LBA) and may convert the logical block address into the physical block address (PBA).

There are various address mapping methods of the flash translation layer depending on a mapping unit. Representative address mapping methods include a page mapping method, a block mapping method, and a hybrid mapping method.

The processor 124 may randomize data received from the external device. For example, the processor 124 may randomize data received from the external device by using a set randomizing seed. The randomized data may be provided to the memory 110 and programmed into the memory cell array of the memory 110.

The processor 124 may de-randomize the data received from the memory 110 during the read operation. For example, the processor 124 may de-randomize the data received from the memory 110 by using a de-randomizing seed. The de-randomized data may be output to the external device.

According to an embodiment, the processor 124 is an application specific integrated circuit (ASIC) where the above-described functions are implemented in the form of logic. The processor 124 can control the operation of the controller 120 based on the functions implemented in hardware.

According to another embodiment, the processor 124 is a general-purpose processor or a digital signaling processor (DSP), and may control the operation of the controller 120 by loading and executing firmware. In other words, in order to control overall operations of the controller 120 and perform logical operations, the processor 124 may execute (drive) firmware loaded into the working memory 125 during booting.

For example, the firmware may include a flash translation layer (FTL), a host interface layer (HIL), and a flash interface layer (FIL). The flash translation layer (FTL) performs a translation function between a logical address that the external device requests from the storage device 100 and a physical address of the memory 110. The host interface layer (HIL) interprets a command requested from the storage device 100 by the external device 150 and transmits the command to the flash translation layer (FTL). The flash interface layer (FIL) transmits the command instructed by the flash translation layer (FTL) to the memory 110.

Such firmware may be, for example, loaded into the working memory 125 from the memory 110 or a separate non-volatile memory (e.g., ROM, NOR Flash) located outside the memory 110. When executing booting after power-on, the processor 124 may first load all or part of the firmware into the working memory 125.

The processor 124 may perform a logic operation defined in the firmware loaded into the working memory 125 in order to control the overall operation of the controller 120. The processor 124 may store a result of performing the logic operation defined in the firmware in the working memory 125. The processor 124 may control the controller 120 to generate a command or signal in accordance with the result of performing the logic operation defined in the firmware. When the part of the firmware, in which the logic operation to be performed is defined, is not loaded into the working memory 125, the processor 124 may generate an event (e.g., interrupt) for loading the corresponding part of the firmware into the working memory 125.

The processor 124 may load, from the memory 110, meta data required to drive the firmware. The meta data is for managing the memory 110 and may include management information on user data stored in the memory 110.

The firmware may be updated while the storage device 100 is being produced or while the storage device 100 is running. The controller 120 may download new firmware from the outside of the storage device 100 and/or may update the existing firmware to the new firmware.

The working memory 125 may store firmware, program codes, commands, or data required to drive the controller 120. The working memory 125 may include, for example, a volatile memory such as one or more of a static RAM (SRAM), a dynamic RAM (DRAM), and a synchronous DRAM (SDRAM).

The error detection and correction circuit 126 may detect an error bit of a target data by using an error correction code and may correct the detected error bit. Here, the target data may be, for example, data stored in the working memory 125 or data read from the memory 110.

Error detection and correction circuit 126 may be implemented to decode data with the error correction code. The error detection and correction circuit 126 may be implemented with a plurality of various code decoders. For example, a decoder that performs non-systematic code decoding or a decoder that performs systematic code decoding may be used. Also, in another example, a hard decoder or a soft decoder may be used.

A bus 127 may be configured to provide a channel between the components 121, 122, 124, 125, and 126 of the controller 120. Such a bus 127 may include, for example, a control bus for transmitting various control signals, commands, and the like, and a data bus for transmitting various data.

Some of the aforementioned components 121, 122, 124, 125, and 126 of the controller 120 may be removed, or some of the aforementioned components 121, 122, 124, 125, and 126 of the controller 120 may be integrated into a single component. In some cases, one or more other components may be added to the above-described components of the controller 120.

Figure 2:
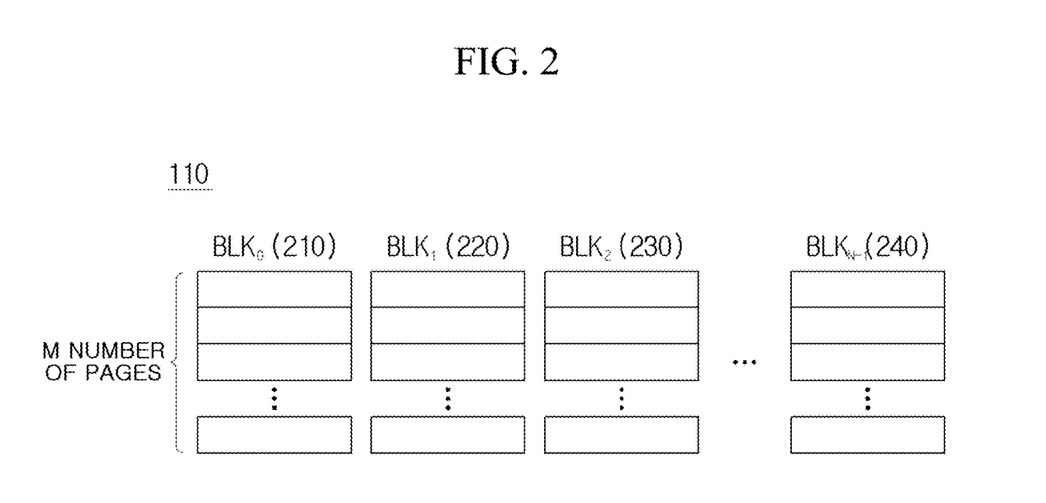
FIG. 2 is a view schematically illustrating an example of a memory of a storage device of FIG. 1.
Figure 3:
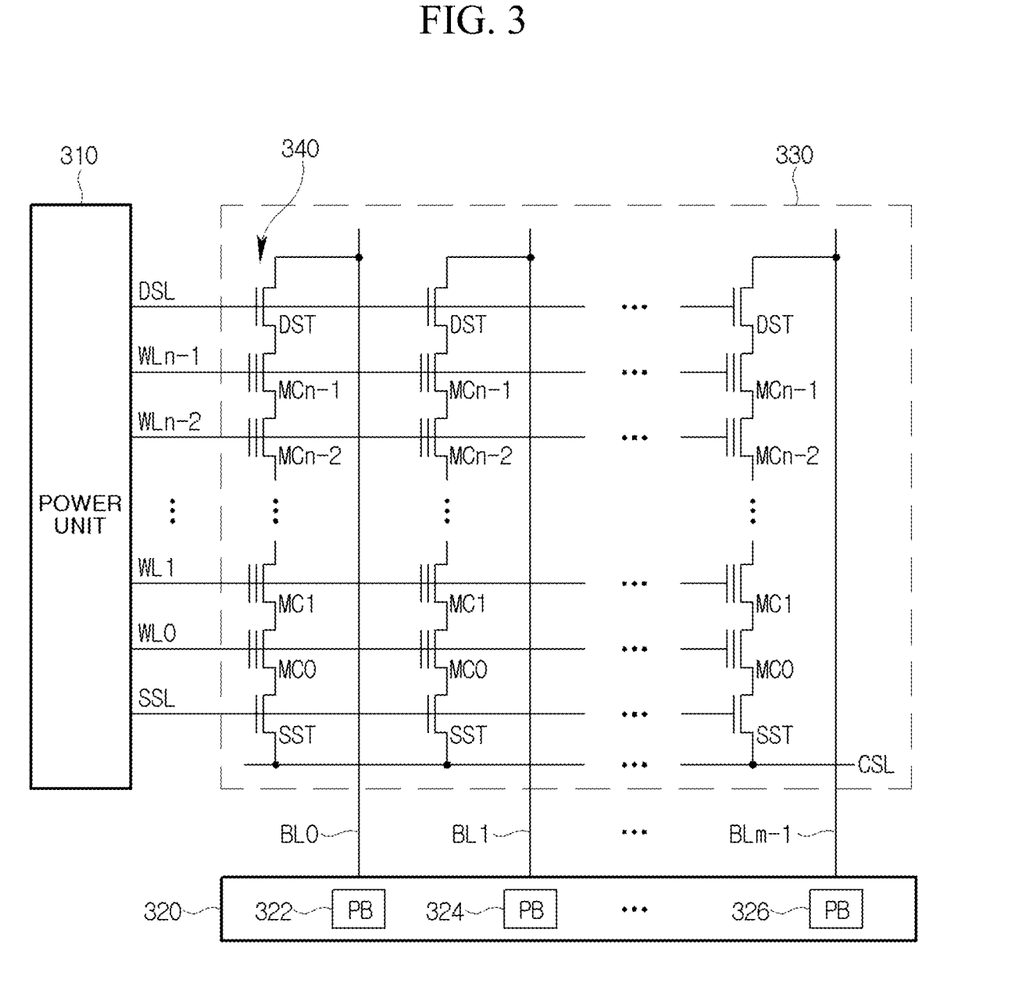
FIG. 3 is a schematic illustration of a memory cell array circuit of a memory block in a memory of FIG. 2.

FIG. 2 is a view schematically illustrating an example of a memory of a storage device of FIG. 1. FIG. 3 is a schematic illustration of a memory cell array circuit of a memory block in a memory of FIG. 2.

Referring to FIG. 2, a memory 110 may include a plurality of memory blocks, such as block 0 ($BLK_0$) 210, block 1 ($BLK_1$) 220, block 2 ($BLK_2$) 230, and block N-1 ($BLK_{N-1}$) 240. Each of the memory blocks 210, 220, 230, and 240 may include a plurality of pages, such as for example an M number of pages (where M is an integer greater than zero). Each of the pages includes a plurality of memory cells to which a plurality of word lines WL is connected.

Also, the memory 110 may include a single level cell (SLC) memory block, a multi-level cell (MLC) memory block, a triple level cell (TLC) memory block, a quadruple level cell (QLC) memory block or a multiple level cell memory block. Here, the SLC memory block includes a plurality of pages of memory cells that store one-bit of data in a memory cell. The SLC memory block has high data operation performance and high durability. The MLC memory block includes a plurality of pages of memory cells that store two-bits data in a memory cell. The TLC memory block includes a plurality of pages of memory cells that store three-bits data in a memory cell. The QLC memory block includes a plurality of pages of memory cells that store four-bits data in a memory cell. The multiple level cell memory block includes a plurality of pages of memory cells that store five or more bits data in a memory cell. The MLC, TLC, QLC and the multiple level cell memory block are able to store more data bits than the SLC memory block, but durability is lower than the SLC memory block.

Referring to FIG. 3, a memory block 330 may include a plurality of cell strings 340 which is implemented in a memory cell array and is connected to bit lines BL0 to BLm-1, respectively. A cell string 340 of each column illustrated in FIG. 3 may include at least one drain select transistor DST, at least one source select transistor SST, and a plurality of memory cell transistors MC0 to MCn-1. The plurality of memory cell transistors MC0 to MCn−1 may be connected in series between the select transistors DST and SST. The plurality of memory cell transistors MC0 to MCn−1 in the same row in the plurality of cell strings 340 may be electrically connected to corresponding word lines WL0 to WLm−1.

A power unit 310 of the memory 110 may supply word line voltages (e.g., program voltage, read voltage, pass voltage, etc.) to the word lines respectively according to an operation mode, and a voltage to be supplied to a bulk (e.g., well region) where the memory cells are formed. Here, a voltage generation operation of the power unit 310 may be performed under the control of a control circuit (not shown). Also, the power unit 310 may generate a plurality of variable read voltages in order to generate a plurality of read data, may select one of the memory blocks (or sectors) of the memory cell array in response to control of the control circuit, which may select one of the word lines of the selected memory block and may provide the word line voltage to the selected word line and unselected word lines, respectively.

A read/write circuit 320 of the memory 110 is controlled by the control circuit and may operate as a sense amplifier or a write driver depending on the operation mode. For example, in a verification/normal read operation, the read/write circuit 320 may operate as a sense amplifier for reading data from the memory cell array. Also, in a program operation, the read/write circuit 320 may operate as a write driver that drives bit lines according to data to be stored in the memory cell array. The read/write circuit 320 may receive data to be written to the cell array from a buffer (not shown) during a program operation and may drive the bit lines according to the input data. To this end, the read/write circuit 320 may include a plurality of page buffers PB 322, 324, and 326, which correspond to columns (or bit lines) or column pairs (or bit line pairs), respectively. Each page buffer 322, 324, and 326 may include a plurality of latches (not shown).

The memory 110 of an existing storage device may deteriorate due to repeated write and read operations, which may result in the controller 120 reading data other than originally written data. If the read data includes an error, then the controller 120 detects and corrects the error by using the error detection and correction circuit 126, thereby recovering the originally written data. If the number of error bits increases, however, then an uncorrectable error correction code (UECC) may occur in which the originally written data cannot be recovered. In order to prevent, in advance, the occurrence of such an uncorrectable error correction code, the controller 120 may perform a scan operation.

The controller 120 reads data from the memory block through the scan operation. If there is an error bit, then the controller 120 corrects the error bit and then performs a read reclaim operation that moves the data of the corresponding memory block to another memory block. This prevents the occurrence of the unrecoverable errors. Such a scan operation consumes significant resources, and if the scan operation is performed frequently, it may reduce the performance of the storage device in the form of a delayed response to a command of the host. If the length of the time period of scanning increases, then the uncorrectable error correction code (UECC) is more likely to occur during a scan operation.

Therefore, in order to suppress the occurrence of the uncorrectable error correction code and to minimize the performance reduction due to a scan operation, it is important to set a priority of the memory block to be scanned and set a period in which the scan operation is performed.

Figure 4:
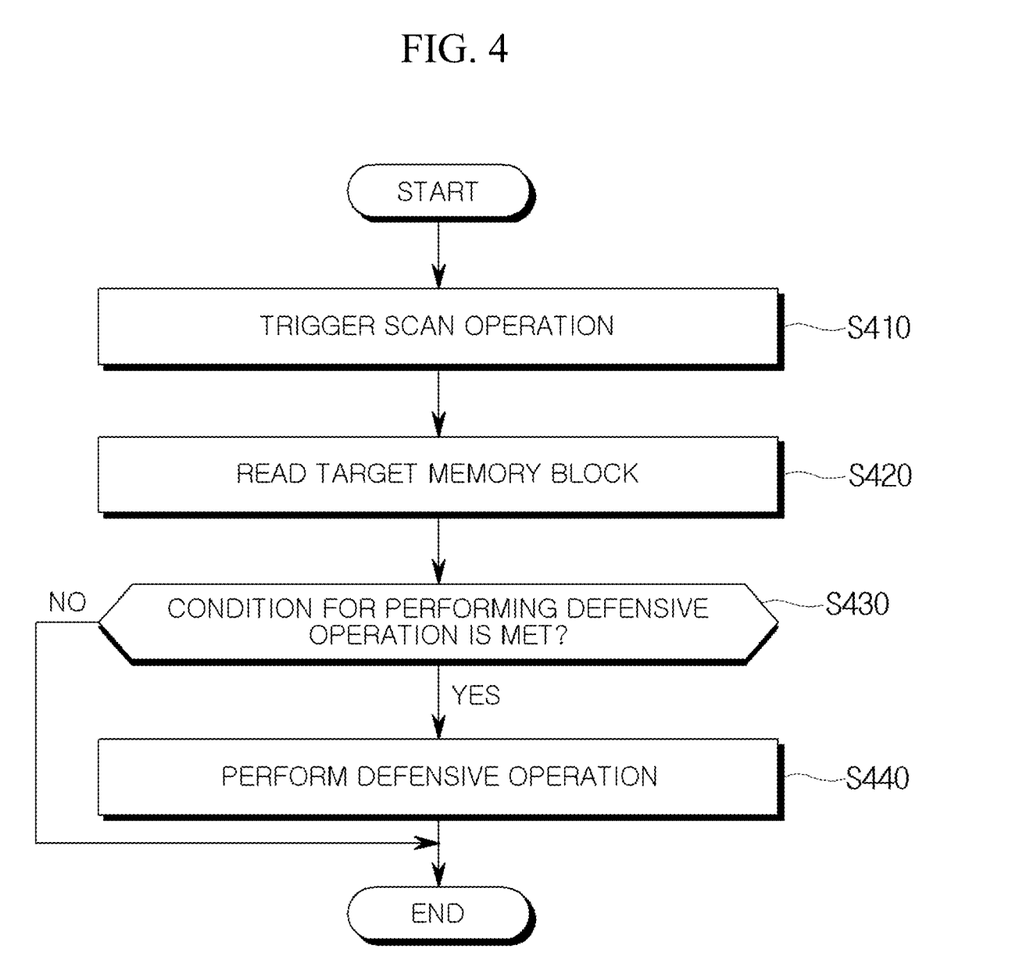
FIG. 4 is a flowchart illustrating a scan operation of a storage device according to an embodiment of the present disclosure.

FIG. 4 is a flowchart illustration a scan operation of a storage device according to an embodiment of the present disclosure.

Referring to FIG. 4, in step S410, a controller 120 of a storage device 100 may trigger a scan operation. The controller 120 may trigger the scan operation based on various conditions. According to some embodiments, various scan modes related to the scan operation trigger may be set, and the controller 120 may trigger the scan operation when the set trigger conditions for each scan mode are satisfied. For example, the scan mode may include a retention scan mode and a read disturb scan mode. The retention scan mode is related to the preservation of NAND memory, and therefore the retention scan is directed to finding electron leaks due to natural or internal defects for electrons that are stored in a floating gate of the memory corresponding to written values. In the retention scan mode, the scan operation can be triggered approximately every 15 days. The read disturb scan mode is related to a data error that occurs due to an electrostatic force generated by the read operation from an adjacent memory cell. In the read disturb scan mode, the scan operation can be triggered in a period of approximately 180 days.

When a scan operation is triggered in step S410, the controller 120 may read a target memory block in step S420. If the controller 120 reads all of the memory blocks in the memory, however, time and resources are wasted and performance would be significantly degraded. Therefore, only a portion of all the memory blocks should be set as target memory blocks to be scanned. In addition, to preserve performance, the controller 120 does not read all of the pages or all of the word lines of the target memory block, but instead may read only some of the pages or word lines. According to embodiments of the disclosure, the controller 120 may set pages or word lines with weak characteristics in which a bit error is highly likely to occur, and the controller 120 selectively reads only the weak pages or weak word lines from among all of the pages of the target memory block. Here, the weak pages or the weak word lines of the target memory block may vary depending on the scan mode and the memory block.

In step S430, the controller 120 may determine whether a condition for performing a defensive operation is met. According to embodiments of the disclosure, the error detection and correction circuit 126 of the controller 120 may determine whether there is a bit error in the data read in step S420. If there is a bit error, then the error detection and correction circuit 126 may correct the detected bit error through a plurality of hard decoding and/or a plurality of soft decoding. During this process, the controller 120 may determine the number of bit errors that have occurred in the data and may determine whether to perform a defensive operation based on the number of bit errors that have occurred. For example, if all the bit errors are corrected during the hard decoding, then the controller 120 may determine not to perform the defensive operation. If all the bit errors are corrected by soft decoding, then the controller 120 may determine to perform the defensive operation. In addition, the controller 120 may determine whether to perform a defensive operation based on the number of bit errors remaining after hard decoding. For example, when there are a small number of remaining bit errors when the controller 120 fails to correct all the bit errors through hard decoding, the controller 120 may determine not to perform the defensive operation. If there are bit errors whose number is larger than or equal to a threshold number of errors, then the controller 120 may perform a defensive operation when the condition is met.

When the controller 120 determines to perform the defensive operation in step S430, the controller 120 may perform the defensive operation in step S440. The defensive operation may be a read reclaim operation that moves a corresponding memory block to another memory block. The corresponding memory block may mean a memory block that includes the read word line, but could also mean a set of memory blocks represented by the memory block including the read word line.

The scan operation shown in FIG. 4 can be performed faster in a shorter period and can prevent unnecessary scan operations, thereby preventing the occurrence of the uncorrectable error correction code and reducing loss in performance.

Figure 5:
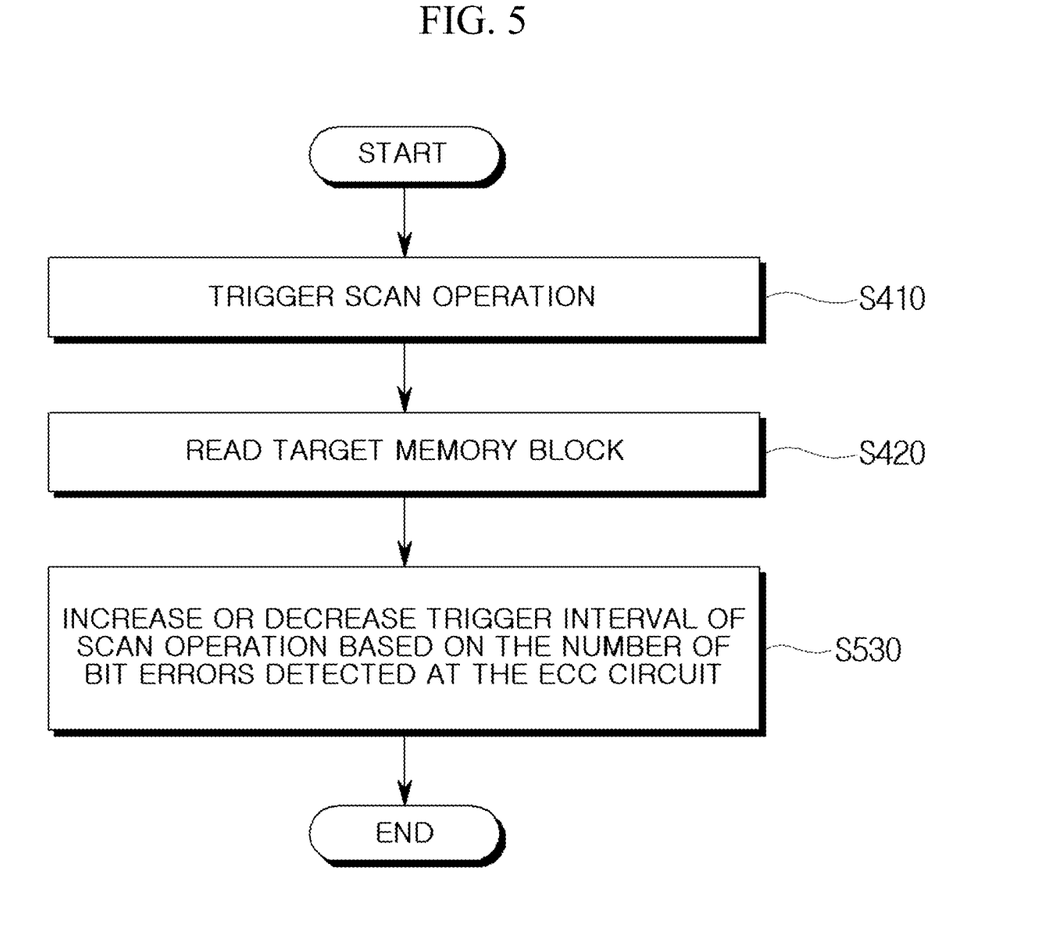
FIG. 5 is a flowchart schematically illustrating a scan operation triggering method according to an embodiment of the present disclosure.

FIG. 5 is a flowchart schematically illustrating a scan operation triggering method according to an embodiment of the present disclosure.

A conventional storage device triggers a scan operation after a regular period of time. For example, in retention mode, the scan operation can be triggered every 15 days, and in read disturb mode, the scan operation may be triggered every 180 days.

In embodiments of the disclosure, the time elapsed until the next scan operation is triggered may be actively determined during the scan operation.

In FIG. 5, steps S410 and S420 correspond to steps S410 and S420 of FIG. 4, in which the controller 120 triggers the scan operation in step S410 and reads the target memory block in step S420.

In step S530, the controller 120 may increase or decrease a trigger period for a scan operation based on the number of bit errors included in the read data detected by error detection and correction circuit 126.

In an embodiment, when the number of bit errors is 0 or data is read without detecting an error through initial hard decoding, the controller 120 may increase the next trigger period of the scan operation to a period that is longer than the currently set period. The controller 120 may set a new trigger period by adding a certain value to the current trigger period, or may set a new trigger period by multiplying the current trigger period by a certain ratio (e.g., 1.2). In addition, the controller 120 may prevent the trigger period from being set to a period of time that is greater than a maximum value. According to some embodiments, the maximum value of the trigger period may be set to an initially set value, thereby preventing the trigger period from increasing.

In an embodiment, when the number of bit errors is equal to or larger than a certain number, the controller 120 may reduce the trigger period by a predetermined value or by a predetermined ratio. For example, in retention mode the controller 120 may set a new trigger period to 14 days by subtracting one day from the currently set trigger period (15 days). Alternatively, the controller 120 may set a new trigger period to 12 days by multiplying the currently set trigger period (15 days) by a predetermined ratio (e.g., 0.8).

In an embodiment, the controller 120 may set new trigger periods based on a predetermined value for each error bit. The following Table 1 shows an example of a predetermined period for each error bit. Table 1 illustrates a trigger period set for the retention mode, but the trigger period may be set to different values in the read disturb mode.

TABLE 1

| The number of bit errors | Trigger period |
| --- | --- |
| 0 | 18 days |
| 1 to 5 | 15 days |
| 5 or more | 12 days |

Referring to Table 1, when the number of bit errors in the read data of the target memory block is 0, the controller 120 reduces unnecessary scan operations by increasing the trigger period to 18 days. When the number of bit errors is one to five, the controller 120 maintains the trigger period at 15 days, which is the initially set trigger period, and when the number of bit errors is more than five, the controller 120 decreases the trigger period to 12 days so that an uncorrectable error correction code may not be occurred.

The above-described operation of changing the trigger period may be performed separately for each memory block, and a different trigger period or a different next trigger time may be set for each memory block. As a result, parameters for triggering the scan operation for each memory block are separately managed and may result in a significant waste of resources. Taking this into consideration, the memory blocks may be graded based on the number of detected error bits, and scan operations may be triggered by a single trigger for a group of memory blocks of the same grade.

Figure 6:
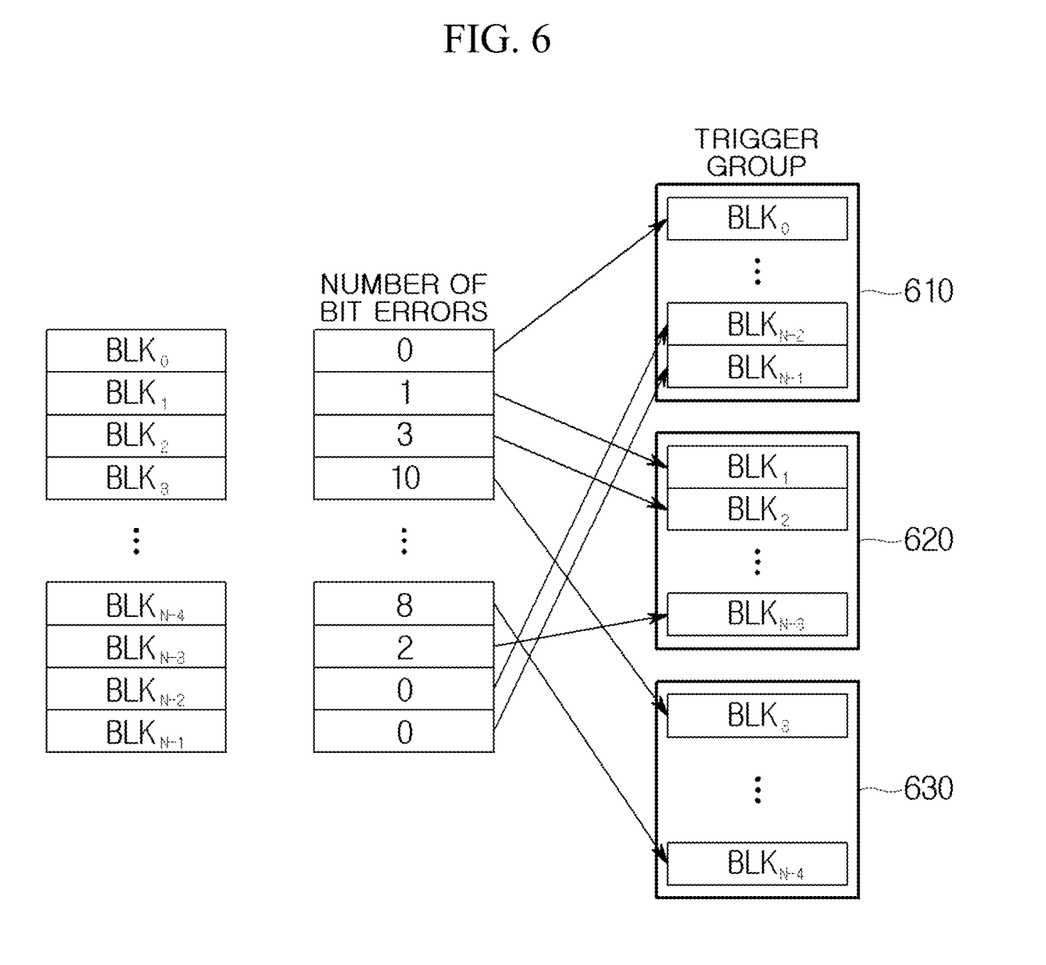
FIG. 6 illustrates an example of assigning memory blocks for inclusion in a plurality of trigger groups according to an embodiment of the present disclosure.

FIG. 6 illustrates an example of assigning memory blocks into a plurality of trigger groups according to an embodiment of the present disclosure.

Referring to FIG. 6, a controller 120 may read the data of each memory block during the scan operation and may assign each memory block to one of a plurality of trigger groups based on the number of bit errors present in the read data of each memory block. In FIG. 6, there may be three trigger groups 610, 620, and 630, and the first trigger group 610 may include memory blocks in which the number of bit errors is 0, and memory blocks in the first trigger group 610 may have a longer trigger period than those of other trigger groups. The second trigger group 620 may include memory blocks in which the number of bit errors ranges from 1 to 5, and memory blocks in the second trigger group 620 may have a trigger period that is shorter than that of the first trigger group 610 but longer than that of the third trigger group 630. The third trigger group 630 may include memory blocks in which the number of bit errors is 6 or more, and memory blocks in the third trigger group 630 may have a shorter trigger period than those in other trigger groups.

Figure 7:
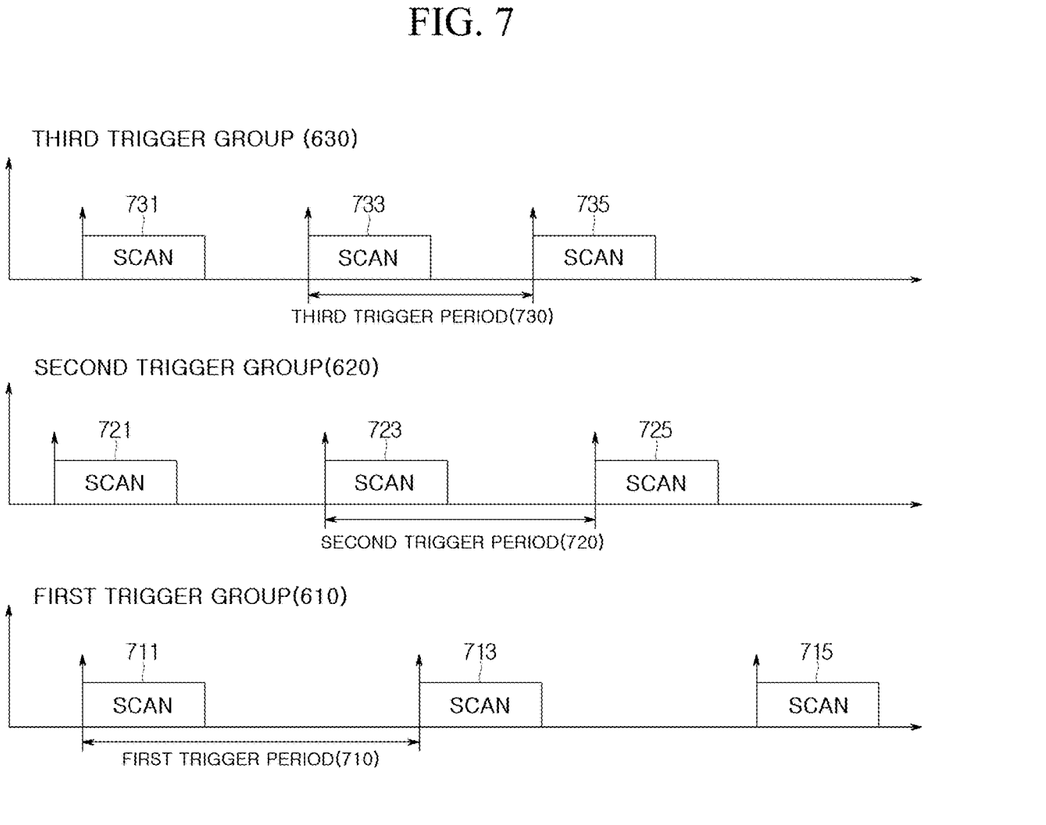
FIG. 7 illustrates examples of scan operations according to trigger groups of FIG. 6, according to an embodiment of the present disclosure.

FIG. 7 illustrates examples of scan operations according to trigger groups of FIG. 6, according to an embodiment of the present disclosure.

Referring to FIG. 7, after designating each memory block to respective trigger groups shown in FIG. 6, scan operations may be performed for a number of times according to the trigger period set for the trigger group. For example, memory blocks of the first trigger group 610 may perform scan operations 711, 713, and 715 according to a first trigger period 710. Memory blocks of the second trigger group 620 may perform scan operations 721, 723, and 725 according to a second trigger period 720. Memory blocks of the third trigger group 630 may perform scan operations 731, 733, and 735 according to a third trigger period 730. After a predetermined number of scan operations are completed, scanned memory blocks may be, as shown in FIG. 6, reassigned to a new trigger group according to the number of bit errors identified during the scan operation. The number of bit errors identified may be the total number of bit errors that have occurred during the scan operation for a memory block after assignment to a trigger group, or the number of bit errors identified may be one of an average number of bit errors or the number of bit errors found in the final scan operation of the predetermined number of scan operations.

Figure 8:
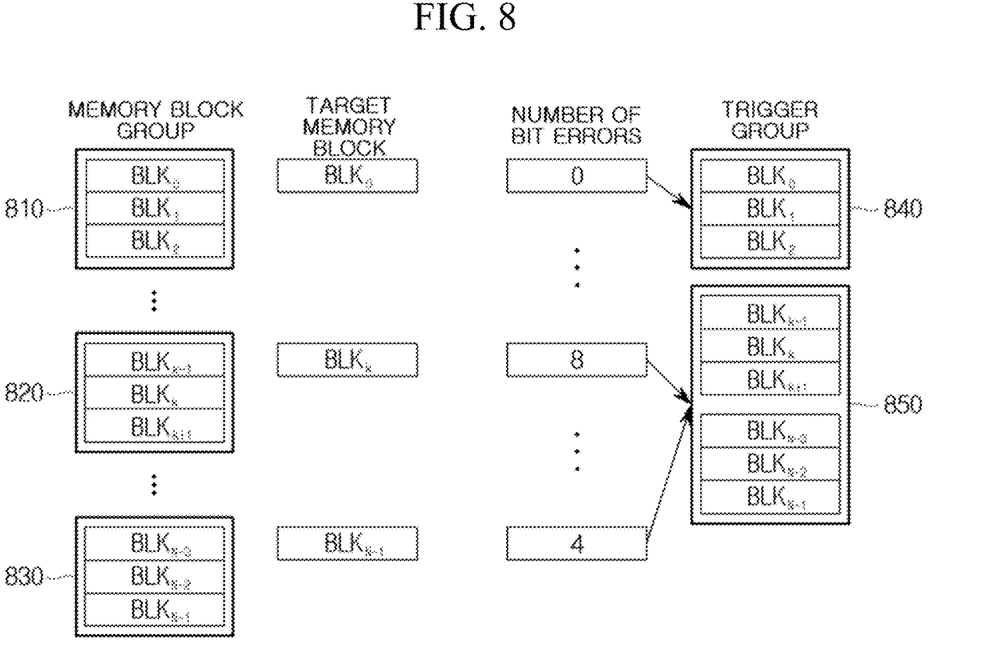
FIG. 8 illustrates an example of assigning memory block groups for inclusion in a plurality of trigger groups according to an embodiment of the present disclosure.

FIG. 8 illustrates an example of assigning memory block groups for inclusion in a plurality of trigger groups according to an embodiment of the present disclosure.

In FIG. 8, instead of scanning all of the memory blocks, only target memory blocks are scanned during a scan operation, and as described with reference to FIG. 4, a memory block group represented by a target memory block may be set. The target memory block may change during each scan operation.

Referring to FIG. 8, all of the memory blocks provided in the memory 110 may be arranged into one of a plurality of memory block groups 810, 820, and 830. The memory blocks can be arranged in various ways. The simplest way to arrange the memory blocks is to arrange adjacent memory blocks into the same memory block group. This method may be used when a target memory block is selected from among a plurality of memory blocks belonging to the same memory block group. In FIG. 8, a memory block $BLK_0$ in the memory block group 810 may be selected as a target memory block, the memory block $BLK_k$ in the memory block group 820 may be selected as a target memory block, and the memory block $BLK_{N-1}$ in the memory block group 830 may be selected as a target memory block. Thus, only one memory block from each memory block group is selected as the target memory block. In other embodiments, however, the controller 120 may select a plurality of memory blocks as the target memory block. In still other embodiments, the controller 120 may select a different number of memory blocks from each memory block group as target memory blocks. In further embodiments, the controller 120 may select different memory blocks as target memory blocks during each scan operation.

The controller 120 may select a target memory block for each memory block group, may read data of the target memory block, and may assign the memory block group to which the target memory block belongs to one of a plurality of trigger groups based on the number of bit errors present in the read data. In FIG. 8, there may be two trigger groups 840 and 850. The first trigger group 840 may include only memory block groups in which the number of bit errors in data read from the target memory block is 0, and may have a set trigger period longer than that of the second trigger group 850. The second trigger group 850 may include memory block groups in which the number of bit errors in data read from the target memory block is greater than four, and may have a trigger period shorter than that of the first trigger group 840.

Figure 9:
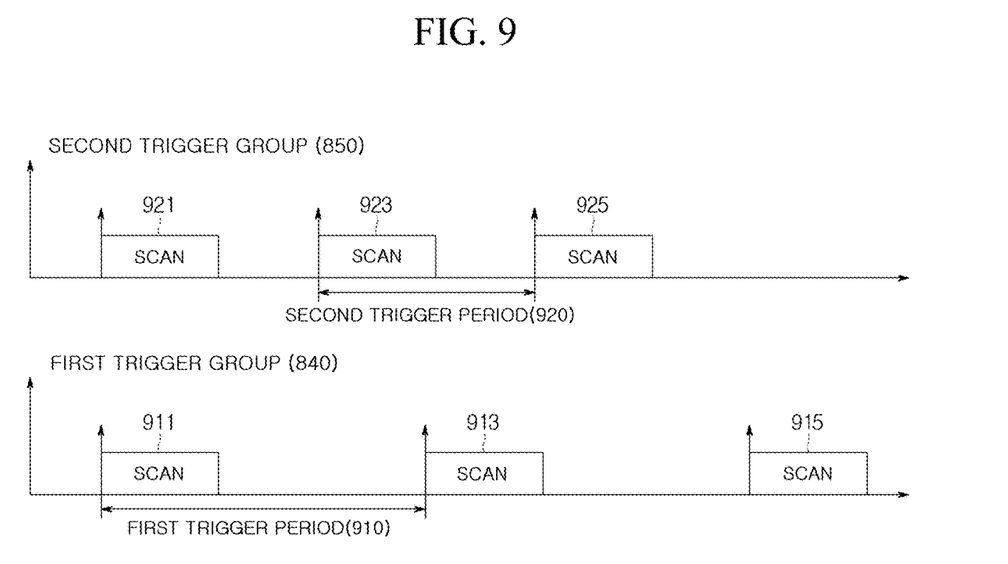
FIG. 9 illustrates examples of scan operations according to trigger groups of FIG. 8, according to an embodiment of the present disclosure.

FIG. 9 illustrates examples of scan operations according to trigger groups of FIG. 8, according to an embodiment of the present disclosure.

Referring to FIG. 9, after assigning each memory block group to a trigger group as shown in FIG. 8, scan operations may be performed for a certain number of times according to the trigger period set for the trigger group. For example, the memory block group corresponding to the first trigger group 840 may perform scan operations 911, 913, and 915 according to a first trigger period 910. The memory block corresponding to the second trigger group 850 may perform scan operations 921, 923, and 925 according to a second trigger period 920. After a certain predetermined number of scan operations are completed, the memory block group may be, as shown in FIG. 8, re-assigned to a new trigger group according to the number of bit errors identified during the scan operation. Here, the number of bit errors identified may be the total number of bit errors that have occurred during the scan operation that the memory block group performs after being assigned to a corresponding trigger group, or the number of bit errors identified may be one of an average number of bit errors or the number of bit errors in the final scan operation (e.g., scan operation 925 or 915).

When a controller 120 reads a memory block during a scan operation, the controller 120 may not read all of the pages or all of the word lines of the memory block, but instead may read only some of the pages or word lines. According to embodiments of the disclosure, the controller 120 may read only weak pages or weak word lines, which are determined to have poor characteristics, among pages or word lines included in the memory block. Accordingly, the controller 120 may preset information on the page or word line to be read according to the memory block and scan mode.

In an embodiment, the controller 120 may be provided with a weak point list that includes information on the weak pages or the weak word lines with weak characteristics. The weak point list that is provided may be different for each scan mode and for each memory module. For example, a weak point list for each memory module may be provided for scan operations in retention mode, and a weak point list for each memory module may be provided for scan operations in read disturb mode. According to an embodiment, a weak point list used in the retention mode may be determined in a step of manufacturing a storage device 100 or during the manufacturing of the storage device. The controller 120 may read weak pages or weak word lines in the weak point list as a page or a word line in the memory block to be read during the scan operation.

According to an embodiment, the controller 120 may change the number of pages or word lines to be read in the memory block depending on the trigger group. For example, the controller 120 may cause the number of word lines to be read when reading a memory block belonging to first trigger groups 610 and 840, which have the longest trigger period, to be less than the number of word lines to be read when reading a memory block belonging to second trigger groups 620 and 850 having a shorter trigger period. Accordingly, by reading more word lines for a trigger group in which more bit errors may occur, it is possible to compensate for a word line deviation in which the number of bit errors varies depending on the read page or word line.

Operations of the storage device according to above-described embodiments of the present disclosure can be summarized as follows.

The storage device may set a plurality of scan trigger groups having different set scan trigger periods, may assign each of the plurality of memory blocks included in the memory to one of the plurality of scan trigger groups, may trigger the scan operation on each of the plurality of memory blocks based on the scan trigger period set for the scan trigger group to which each memory block belongs, and may perform the scan operation on the memory block in which the scan operation has been triggered.

The storage device may read data from the memory block in which the scan operation has been triggered, and in order to perform the scan operation on the memory block in which the scan operation has been triggered, may determine the number of bit errors included in the read data, and may move the data of the memory block in which the scan operation has been triggered to another memory block if the number of bit errors is greater than a first set value.

In order to assign each of the plurality of memory blocks to one of the plurality of scan trigger groups, the storage device may assign the memory block in which the scan operation has been triggered to one of the plurality of trigger groups based on the number of bit errors in the process of performing the scan operation on the memory block in which the scan operation has been triggered.

In order to assign the memory block in which the scan operation has been triggered to one of the plurality of scan trigger groups based on the number of bit errors, the storage device may assign the memory block with a relatively small number of bit errors to the scan trigger group with a relatively longer scan trigger period compared to a memory block with a relatively large number of bit errors.

When the storage device performs an operation of assigning a second memory block to one of the plurality of trigger groups, the storage device may perform the scan operation on the second memory block by a predetermined second set value, and then may assign the second memory block to a new scan trigger group.

When the storage device reads data from the memory block in which the scan operation has been triggered, the storage device may read data from some, but not all, of the word lines included in the memory block in which the scan operation has been triggered.

When the storage device reads data from the memory block in which the scan operation has been triggered, the storage device may read data of only some word lines with weak characteristics compared to other word lines from among all the word lines included in the memory block in which the scan operation has been triggered.

In order to read data of only some word lines out of all of the word lines included in the memory block in which the scan operation has been triggered, the storage device may set, different for each scan trigger group, the number of word lines to be read. Only data of as many word lines as the above-set number is read, from among all the word lines included in the memory block in which the scan operation has been triggered based on the scan trigger group to which the memory block belongs.

The storage device may assign each of the plurality of memory blocks to one of the plurality of memory block groups, may assign each of the plurality of memory block groups to one of the plurality of scan trigger groups, may trigger the scan operation on each of the plurality of memory block groups based on the scan trigger period set for the scan trigger group to which each memory block group belongs, may perform the scan operation on the memory block group in which the scan operation has been triggered, may select a target memory block from among the memory blocks belonging to the memory block group in which the scan operation has been triggered, may read data from the selected target memory block, may determine the number of bit errors included in the read data, and may determine the scan trigger group in which the memory block group in which the scan operation has been triggered is to be assigned based on the number of bit errors.

If the number of bit errors is greater than the first set value, in order to perform the scan operation on the memory block group in which the scan operation has been triggered, the storage device may further include an operation to move the data of the memory block belonging to the memory block group in which the scan operation has been triggered to another memory block.

The storage device may set different numbers of target memory blocks selected for each scan trigger group, and may select the target memory block from among the memory blocks of the memory block group in which the scan operation has been triggered, based on the number of target memory blocks set for the scan trigger group to which the memory block group belongs.

The storage device may read only data of some word lines out of all the word lines included in the target memory block.

In addition, the storage device may set different numbers of word lines that are read from the target memory block for each scan trigger group, and may read only the data of some word lines out of all the word lines included in the target memory block based on the number of word lines set in the scan trigger group to which the memory block group belongs.

As described above, according to the embodiments of the present disclosure, each memory block is assigned to one of the plurality of trigger groups based on the number of bit errors that occur for each memory block read during the scan operation, and a time interval (trigger period) in which the scan operation is performed for each trigger group is set to different values. Therefore, an unnecessary scan operation is prevented from being performed by increasing the time interval for robust memory modules, and the scan operation is performed on weak memory modules at smaller time intervals, so that the uncorrectable error correction code (UECC) can be prevented from occurring. Accordingly, embodiments of the present disclosure can improve the performance of a storage device.

The foregoing is only an illustrative description of the spirit of the present invention. Various substitutions, modification and changes may be made therein without departing from the essential features of the present invention by those skilled in the art. Therefore, the embodiments and accompanying drawings of the present invention are not intended for limiting the disclosure but intended for describing the spirit of the present invention, and the spirit and scope of the present invention are not limited by the embodiments and accompanying drawings. The scope of the present invention can be construed by the appended claims. All the inventions within the scope equivalent to the claims should be construed to be included in the scope of the present invention.

What is claimed is:

1. A storage device comprising:
   a memory including a plurality of memory blocks; and
   a controller configured to:
   set a plurality of scan trigger groups having different scan trigger periods,
   perform a scan operation on the plurality of memory blocks,
   assign each of the plurality of memory blocks to one of the plurality of scan trigger groups based on a number of bit errors included in data read from each of the plurality of memory blocks, and
   set different scan trigger periods for each of the plurality of memory blocks based on the scan trigger groups to which each of the plurality of memory blocks belongs.

2. The storage device of claim 1, wherein the controller is configured to set a scan trigger period of a scan trigger group with a small number of bit errors included in the data to be longer than a scan trigger period of a scan trigger group with a large number of bit errors included in the data.

3. The storage device of claim 1, wherein, when the scan operation on a first memory block is triggered, the controller is configured to read data from the first memory block, determine a number of bit errors included in the data read from the first memory block, and move the data of the first memory block to another memory block if the number of bit errors included in the data of the first memory block is greater than a first set value.

4. The storage device of claim 3, wherein the controller is configured to determine a scan trigger group to which the first memory block belongs based on the number of bit errors.

5. The storage device of claim 4, wherein, after determining the scan trigger group for the first memory block and performing the scan operation by a second set value, the controller is configured to set a new scan trigger group for the first memory block.

6. The storage device of claim 3, wherein the controller is configured to read data of some word lines included in the first memory block and to determine a number of bit errors included in the data read from some word lines.

7. The storage device of claim 6, wherein the controller is configured to read data of some word lines with weak characteristics compared to other word lines, from among all the word lines included in the first memory block, and to determine a number of bit errors included in the data read from some word lines with weak characteristics.

8. The storage device of claim 6, wherein the controller is configured to set, for each scan trigger group, a different number of word lines to be read from the first memory block.

9. The storage device of claim 8, wherein the controller is configured to set a larger number of word lines to be read from a scan trigger group with a short scan trigger period compared to a scan trigger group with a long scan trigger period.

10. A storage device comprising:
a memory including a plurality of memory blocks; and
a controller configured to:
set a plurality of scan trigger groups having different scan trigger periods,
assign each of the plurality of memory blocks to one of a plurality of memory block groups,
perform a scan operation on the plurality of memory block groups,
select, for each of the plurality of memory block groups, a target memory block from among the memory blocks belonging to each of the plurality of memory block groups,
read data from the target memory block,
assign the memory block groups to which the target memory block belongs to one of the plurality of scan trigger groups based on a number of bit errors included in the data read from the target memory block, and
set different scan trigger periods for the memory block groups based on the scan trigger groups to which the each of the memory block groups belongs.

11. The storage device of claim 10, wherein, when the scan operation on a first memory block group is triggered, the controller is configured to:
read data from a target memory block selected from the first memory block group,
determine a number of bit errors included in the read data,
determine a scan trigger group in which the first memory block group is to be assigned, based on the number of bit errors included in the read data, and
move data of the memory blocks belonging to the first memory block group to another memory block if the number of bit errors included in the read data is greater than a first set value.

12. The storage device of claim 11, wherein the controller is configured to set different numbers of target memory blocks that are selected from among the memory blocks of the first memory block group based on the scan trigger group to which the first memory block group belongs.

13. An operating method of a storage device, the operating method comprising:
setting a plurality of scan trigger groups having different scan trigger periods;
assigning each of a plurality of memory blocks included in a memory to one of the plurality of scan trigger groups based on a number of bit errors included in data read from each of the plurality of memory blocks;
triggering a scan operation on each of the plurality of memory blocks based on a scan trigger period of a scan trigger group to which each memory block belongs; and
performing the scan operation on each of the plurality of the memory blocks in which the scan operation has been triggered.

14. The operating method of claim 13, wherein the performing the scan operation on each of the plurality of the memory blocks comprises:
reading the data from the memory blocks in which the scan operation has been triggered;
determining the number of bit errors included in the data; and
moving the data of the memory blocks in which the scan operation has been triggered to another memory block if the number of bit errors is greater than a first set value.

15. The operating method of claim 14, wherein the assigning each of the plurality of memory blocks comprises assigning the memory blocks in which the scan operation has been triggered to one of the plurality of scan trigger groups based on the number of bit errors included in the data.

16. The operating method of claim 15, wherein the assigning the memory blocks in which the scan operation has been triggered to one of the plurality of scan trigger groups based on the number of bit errors comprises assigning memory blocks with a small number of bit errors to a scan trigger group with a longer scan trigger period.

17. The operating method of claim 15, wherein, after assigning the memory blocks to one of the plurality of scan trigger groups, the scan operation is performed on the memory blocks by a second set value, and then assigning the memory blocks to a new scan trigger group.

18. The operating method of claim 14, wherein the reading data from the memory blocks in which the scan operation has been triggered is reading data of some word lines included in the memory blocks in which the scan operation has been triggered.

19. The operating method of claim 18, wherein the reading data of some word lines included in the memory blocks in which the scan operation has been triggered is reading data of word lines with weak characteristics from among all the word lines included in the memory blocks in which the scan operation has been triggered.

20. The operating method of claim 18, wherein the reading data of some word lines included in the memory blocks in which the scan operation has been triggered comprises:
setting, for each scan trigger group, a number of word lines to be read; and reading data of as many word lines as the set number, from among all the word lines included in the memory blocks in which the scan operation has been triggered.

* * * * *